United States Patent
Clapper et al.

(10) Patent No.: US 6,752,720 B1
(45) Date of Patent: Jun. 22, 2004

(54) MOBILE REMOTE CONTROL VIDEO GAMING SYSTEM

(75) Inventors: Edward O. Clapper, Tempe, AZ (US); Greg E. Scott, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 325 days.

(21) Appl. No.: 09/595,296

(22) Filed: Jun. 15, 2000

(51) Int. Cl.[7] ............................................. A63F 13/00
(52) U.S. Cl. ........................... 463/58; 463/62; 463/64; 463/5; 472/60; 446/454
(58) Field of Search ............................ 463/5, 58, 6, 7, 463/62–64; 472/60, 62, 57, 137; 340/323 R; 446/454, 456

(56) References Cited

U.S. PATENT DOCUMENTS

| | | | |
|---|---|---|---|
| 5,481,257 A | 1/1996 | Brubaker et al. | 340/825.69 |
| 5,729,016 A * | 3/1998 | Klapper et al. | 250/332 |
| 6,309,306 B1 * | 10/2001 | Geagley et al. | 463/58 |
| 6,390,883 B1 * | 5/2002 | Choi | 446/436 |

FOREIGN PATENT DOCUMENTS

| | | | |
|---|---|---|---|
| EP | 0696022 A1 | 2/1996 | |
| GB | 2217220 | * 10/1989 | A63H/17/26 |
| JP | 07178235 | 7/1995 | |
| WO | WO 98/46323 | * 10/1998 | A63F/9/22 |
| WO | WO00/16869 | 3/2000 | |

OTHER PUBLICATIONS

Kita Kazunori, "Control Device", 1 page, Publication No. 07178235, Publication Date Jul. 18, 1995, Application Date Dec. 21, 1993, Application No. 05345111.

Kato Yoshinori, "Circuit Game Device", 1 page, Publication No. 02031783, Publication Date Feb. 1, 1990, Application Date Jul. 21, 1988, Application No. 63182572.

* cited by examiner

*Primary Examiner*—Mark Sager
*Assistant Examiner*—Aaron Capron
(74) *Attorney, Agent, or Firm*—Marger Johnson & McCollom

(57) ABSTRACT

In one embodiment, a gaming system includes a mobile remote control vehicle. The mobile remote control vehicle communicates wirelessly with a control unit, and may be operated outside a line-of-sight (LOS) of the control unit.

57 Claims, 6 Drawing Sheets

MOBILE REMOTE CONTROL VIDEO GAMING SYSTEM

FIELD OF THE INVENTION

This invention pertains to a gaming system, and more particularly to a gaming system including a remote control vehicle that may be remotely operated.

BACKGROUND OF THE INVENTION

Remote control vehicle operations as entertainment have been around in various forms for several decades. Starting with model railroads and extending through today's radio-controlled stunt cars, users have had the ability to operate vehicles of one form or another without actually getting "behind the wheel." Remote operation also gives users the ability to experience operating vehicles that they normally would not be able to operate, such as trains and airplanes.

Computers have given users alternative ways to entertain themselves. From the early days of video games, the computer has allowed the user to experience an entirely original environment, with completely alien characters and even different physical laws. Computers also allow users to simulate the experience of remote control operations by placing the user within a simulated environment. There are two primary advantages to computer simulation of the remote control vehicle: first, there is no physical toy that may be damaged, and second, the user sees things as he would if he were sitting behind the controls of the vehicle.

But each of these forms of entertainment has disadvantages. With the remote control vehicle, the user must remain within the line-of-sight (LOS) of the vehicle for the remote control to operate. And the remote control vehicle cannot in any way immerse the user in a different world: the user is limited to interacting with real objects. Computer simulation, on the other hand, requires that the computer generate the entire perspective of the user. Computer simulation cannot take advantage of the real world environment, not even letting the user mix the real world with fictional elements.

The present invention addresses these and other problems associated with the prior art.

DETAILED DESCRIPTION

Figure 1:
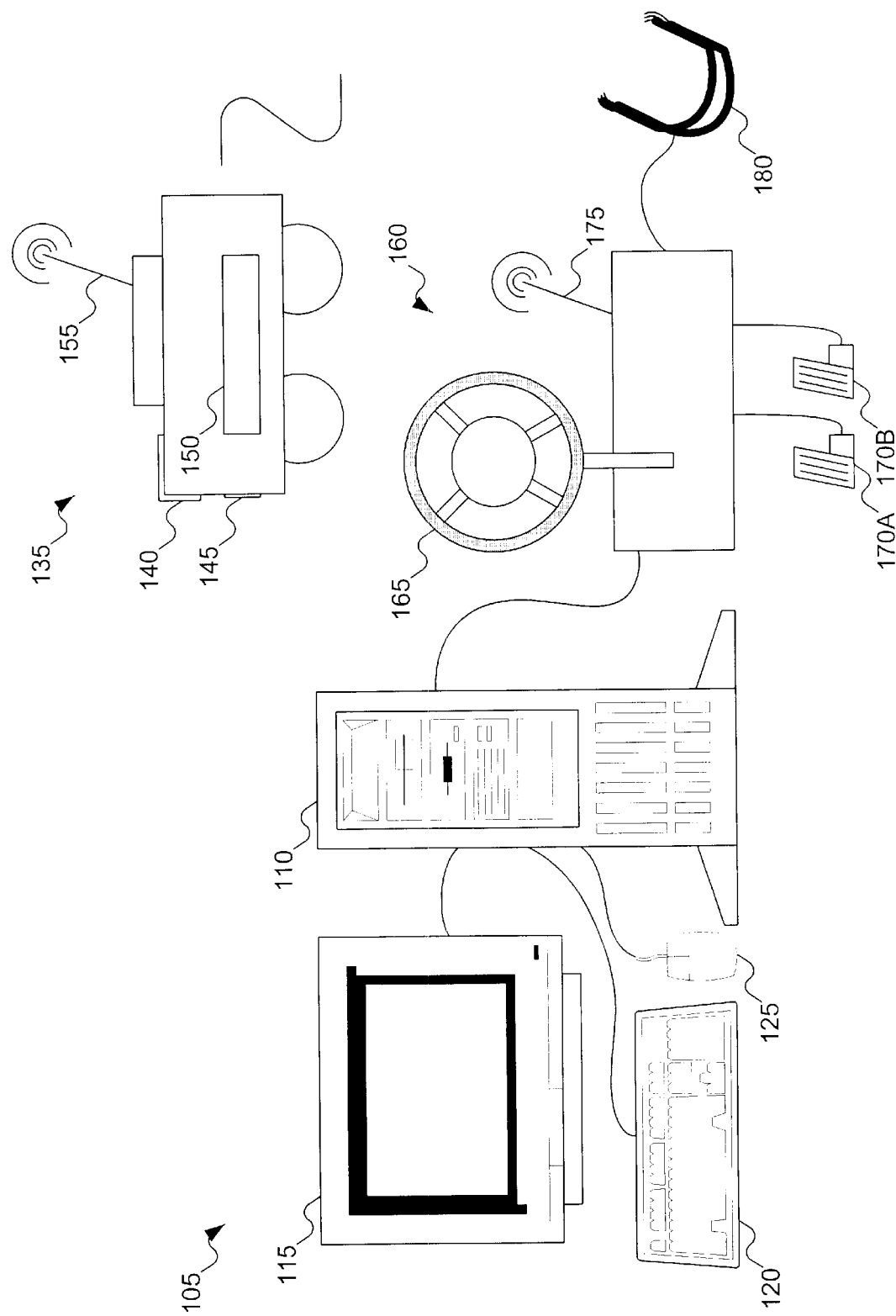
FIG. 1 shows a computer system, control unit, and mobile remote control vehicle in accordance with a first embodiment of the invention.

FIG. 1 shows a computer system 105 in accordance with a first embodiment of the invention. Computer system 105 includes a computer 110, a monitor 115, a keyboard 120, and a mouse 125. Computer 110 includes a central processing unit, a memory, and a cache according to the first embodiment of the invention (not shown). Computer system 105 may also include other equipment not shown in FIG. 1, for example, other input/output equipment or a printer.

Mobile remote control vehicle 135 (shown in profile view) provides part of the entertainment in the first embodiment of the invention. Mobile remote control vehicle 135 includes a camera 140 that captures real-time imagery data (a view from the front of mobile remote control vehicle 135). Mobile remote control vehicle 135 also has sensors 145 and 150. Sensors 145 and 150 sense the environment surrounding mobile remote control vehicle 135. For example, sensor 145 may be a depth-of-field sensor to determine how far away objects in the environment are, and sensor 150 may be a collision sensor to determine contact with a neighboring object. Mobile remote control vehicle 135 may also have additional sensors.

In the first embodiment, mobile remote control vehicle 135 includes antenna 155 for wireless control of mobile remote control vehicle 135. Antenna 155 allows remote control of mobile remote control vehicle 135 without the control unit being within a line-of-sight (LOS) of mobile remote control vehicle 135. A person skilled in the art will recognize other possible implementations, such as a wire-line technology physically connecting the control unit with mobile remote control vehicle 135.

In an alternate embodiment, camera 140 may be mounted on an adjustable harness. This allows the user to control the camera semi-independently from mobile remote control vehicle 135. For example, camera 140 may be rotated or tilted to present a view other than looking directly in front of mobile remote control vehicle 135. The orientation of camera 140 may be operated with a pointing mechanism on control unit 160 (see below), or may be operated from computer system 105.

In the first embodiment, control unit 160 is connected to computer system 105. Control unit 160 has some controls for controlling the motion of mobile remote control vehicle 135. In FIG. 1, mobile remote control vehicle 135 is a car, and control unit 160 includes steering wheel 165 and pedals 170A and 170B. A person skilled in the art will recognize other techniques for controlling mobile remote control vehicle 135 are possible, depending on the embodiment of mobile remote control vehicle 135. For example, if mobile remote control vehicle 135 is some form of watercraft, control unit 160 may include a steering wheel and thrust levers. Or if mobile remote control vehicle 135 is a plane, then control unit 160 may include a steering column, thrust levers, and pedals. In the first embodiment, control unit 160 includes craft-specific controls for the type of craft mobile remote control vehicle 135 is. But a person skilled in the art will recognize that other control forms are possible. For example, with radio-controlled vehicles, it is common to use two levers to control vehicle motion: one to control acceleration and deceleration, and one to control vehicle direction. It is even possible to eliminate all controls from control unit 160 and use computer system 105 to control vehicle movement.

Control unit 160 also includes antenna 175 for communicating with mobile remote control vehicle 135. As discussed above, in the first embodiment antenna 175 allows the user to wirelessly control mobile remote control vehicle 135 without LOS. However, wire-line control and limited wireless LOS operation of mobile remote control vehicle 135 is possible.

In the first embodiment, control unit 160 includes only the minimum equipment necessary to control the vehicle. Any elements not required to operate the vehicle are not included in control unit 160. For example, control unit 160 includes no display for displaying fuel gauges, speedometers, weapon loads, and other such information. Instead, such information is treated as game data and is overlaid onto the image displayed on computer system 105. However, a person skilled in the art will recognize that other embodiments are possible by including the necessary gauges as part of control unit 160.

In the first embodiment, computer system 105 receives the imagery from camera 140 and the sensor data from sensors 145 and 150 from mobile remote control vehicle 135 through control unit 160 and antenna 175. Compression may be used to allow for a more rapid transfer of information, but is not required. Computer system 105 then creates a composite of real-world imagery and virtual data by using the sensor data to calculate the position, size, and orientation of computer-generated characters and game data, and overlaying the computer-generated data onto the imagery from camera 140. (The use of imagery from camera 140 reduces the load on computer system 105.) Since camera 140 on mobile remote control vehicle 135 is effectively the user's "eye," game data is generated relative to the position of mobile remote control vehicle 135. The composite image allows the user to operate mobile remote control vehicle 135 in a user-selectable real-world environment, but to play a computer-controlled random game with mobile remote control vehicle 135.

In an alternate embodiment, control unit 160 is not connected to computer 105. Instead, visor 180 is connected to control unit 160. Visor 180 includes all the equipment to present the user with the display that would otherwise be shown on computer system 105. Effectively, visor 180 may be a wearable monitor. Assuming control unit 160 includes the equipment (e.g., a processor, memory, etc.) to generate the game data, visor 180 may display to the user the same information the user would see on computer system 105. And if control unit 180 cannot generate the game data, visor 180 may still display the real-time imagery received from mobile remote control vehicle 135, allowing the user to operate mobile remote control vehicle 135 without LOS.

In another alternate embodiment, mobile remote control vehicle 135 includes more than one camera. The imagery from all the cameras is received by computer system 105 and used as needed for the game. For example, in a driving game a second camera may be mounted rearwards on mobile remote control vehicle 135 to provide imagery to simulate a rear-view mirror.

In another alternate embodiment, mobile remote control vehicle 135 may also include objects to save having to simulate them. For example, mobile remote control vehicle 135 may include projectiles and a projectile launcher for a shoot-'em-up game. Mobile remote control vehicle 135 may also rotate or tilt the projectile launcher, so that the user may adjust where the projectile is aimed without having to move mobile remote control vehicle 135. The projectile may be operated with a pointing mechanism on control unit 160, or may be operated from computer system 105.

Figure 2:
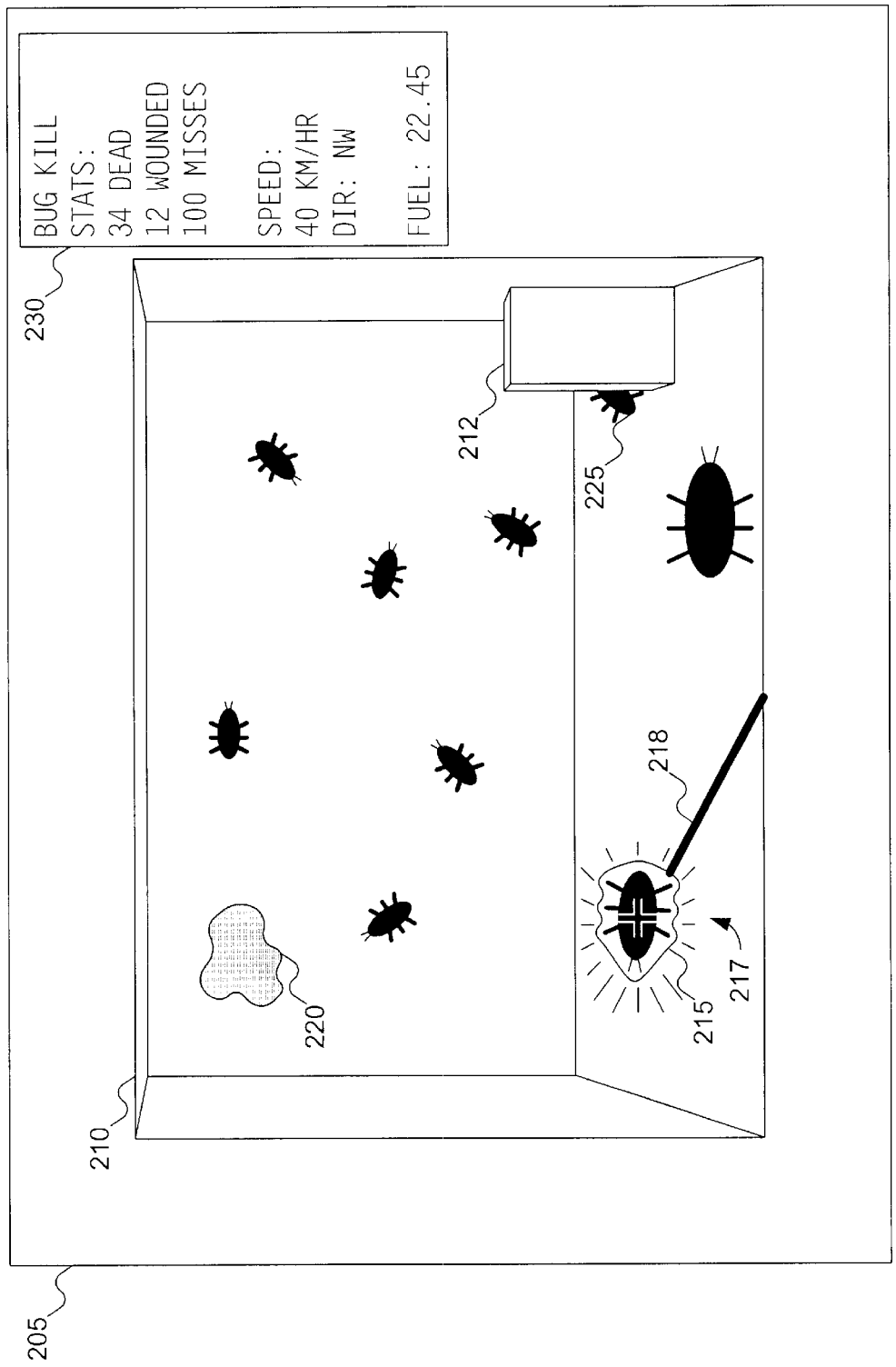
FIG. 2 shows a sample display on the computer system of FIG. 1.

FIG. 2 shows a possible display on computer system 105 implementing the first embodiment of the invention. In FIG. 2, screen shot 205 shows a view 210 into a room. The user is playing a shoot-'em-up game that requires the player to blast all the creatures with a laser. View 210 starts with the real-time imagery received from camera 140 of mobile remote control vehicle 135. The only real-world objects shown in view 210 are the walls and block 212. Computer system then superimposes the game data. In FIG. 2, the game data includes creatures such as creature 215 (creature 215 is in the process of being killed), laser target 217, laser 218, and stain 220. Stain 220 represents a creature that had been killed earlier, leaving a mark on the wall. Game data such as stain 220 may be a temporary effect, fading in time, so that after a sufficient amount of time passes, stain 220 will be gone. This helps to prevent computer system 105 from having to generate more and more game data, potentially slowing the game down.

Using sensors such as sensors 145 and 150 on mobile remote control vehicle 135, computer system 105 may determine features about the room in which mobile remote control vehicle 135 is placed. For example, if mobile remote control vehicle 135 includes a depth-of-field sensor, computer system 105 may determine the size and position of block 212. Then, computer system may simulate creatures behind block 212, such as creature 225.

Screen shot 205 may also display to user statistics block 230. Statistics block 230 gives the user information about his performance in the game. For example, statistics block 230 shows the user's success/failure rate with killing creatures, the vehicle's simulated speed and direction, and the amount of simulated fuel remaining. Other statistics may also be displayed, depending on the game being played.

In an alternate embodiment, computer system 105 may add special effects. For example, in FIG. 2, computer system 105 may simulate illuminating block 212 to reflect the flash of laser 218.

Figure 3:
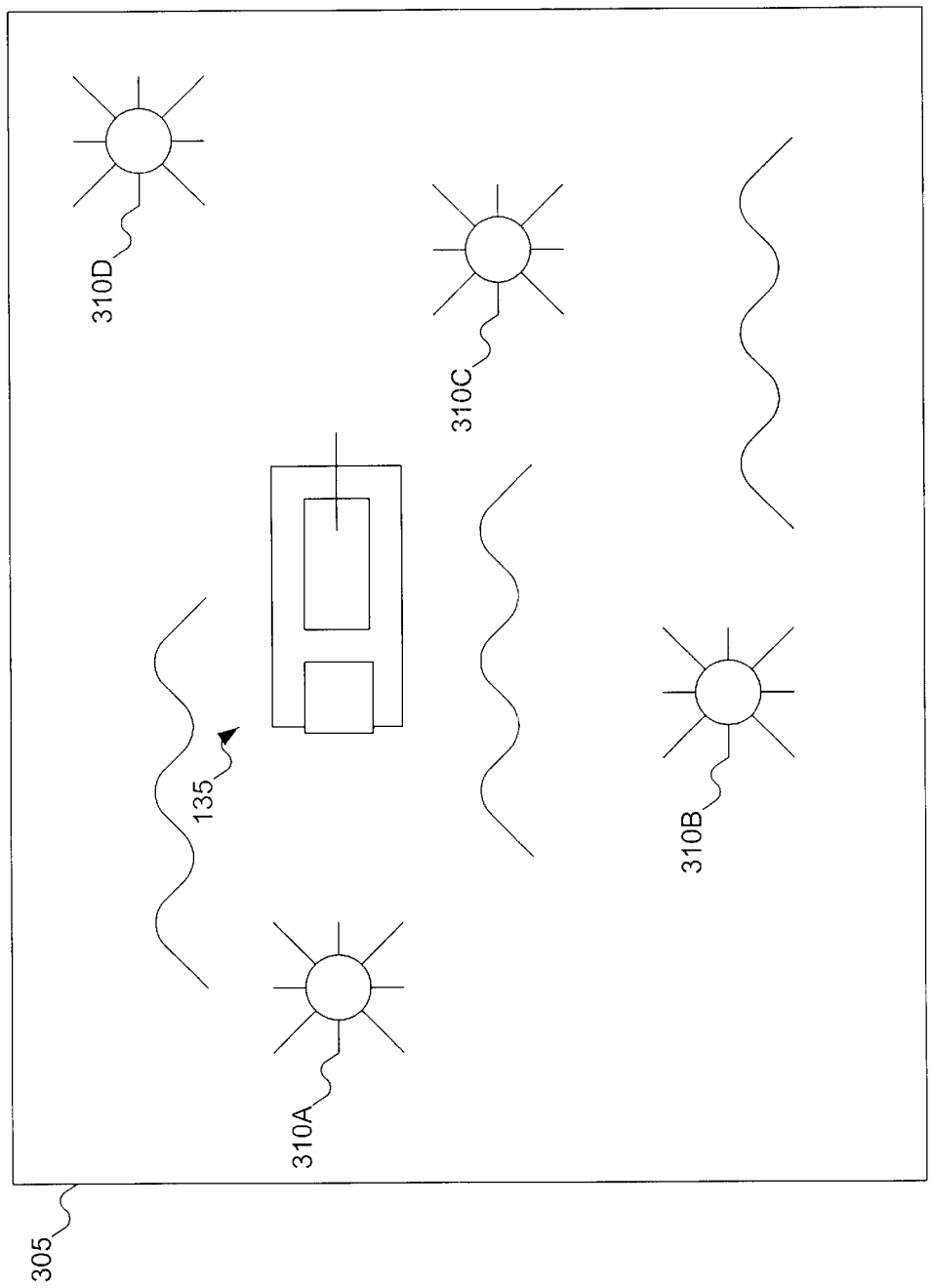
FIG. 3 shows mobile remote control vehicle according to FIG. 1 interacting with remote objects.

In another alternative embodiment, mobile remote control vehicle 135 may interact with remote objects. These remote objects are part of the game, allowing for the game to include more real-world elements. This helps to reduce the amount of game data computer system 105 must generate. FIG. 3 shows mobile remote control vehicle 135 (in a top-down view) interacting with such remote objects. In FIG. 3, mobile remote control vehicle 135 is a boat placed in pool 305. Remote objects 310A–310D are mines. Remote objects 310A–310D are programmed so that when mobile remote control vehicle 135 contacts one of the remote objects, the computer simulates an explosion damaging mobile remote control vehicle 135.

To interact with mobile remote control vehicle 135, remote objects 310A–310D must communicate with computer system 105. Remote objects 310A–310D may communicate directly with computer system 105 through the antenna on the control unit, or may communicate through mobile remote control vehicle 135 (e.g., as a side-band channel).

Remote objects 310A–310D may be stationary (e.g., floating mines) or mobile (e.g., a chase-plane). In addition, remote objects 310A–310D may include cameras and sensors similar to camera 140 and sensors 145 and 150 on mobile remote control vehicle 135. The imagery and/or data from remote objects 310A–310D may be utilized by computer system 105 just like the imagery and/or data from mobile remote control vehicle 135. Depending on the circumstances, the user may be presented with imagery from cameras on all remote objects 310A–310D simultaneously, or may be required to select imagery from a particular remote object 310A–310D.

In the alternate embodiment using remote objects, computer system 105 may be tuned to vary the simulated reaction of mobile remote control vehicle 135 based on identical sensor data. Computer system 105 may be set to react one way when contacting an ordinary object in the environment, but to react in a different way when contacting a remote object inserted into the environment for the game. For example, when a sensor determines that mobile remote control vehicle 135 has struck the side of pool 305, computer system 105 may simulate minor impact damage to mobile remote control vehicle 135. But when a sensor determines that mobile remote control vehicle 135 has struck one of remote objects 310A–310D, computer system 105 may simulate more severe damage to mobile remote control vehicle 135.

Figure 4:
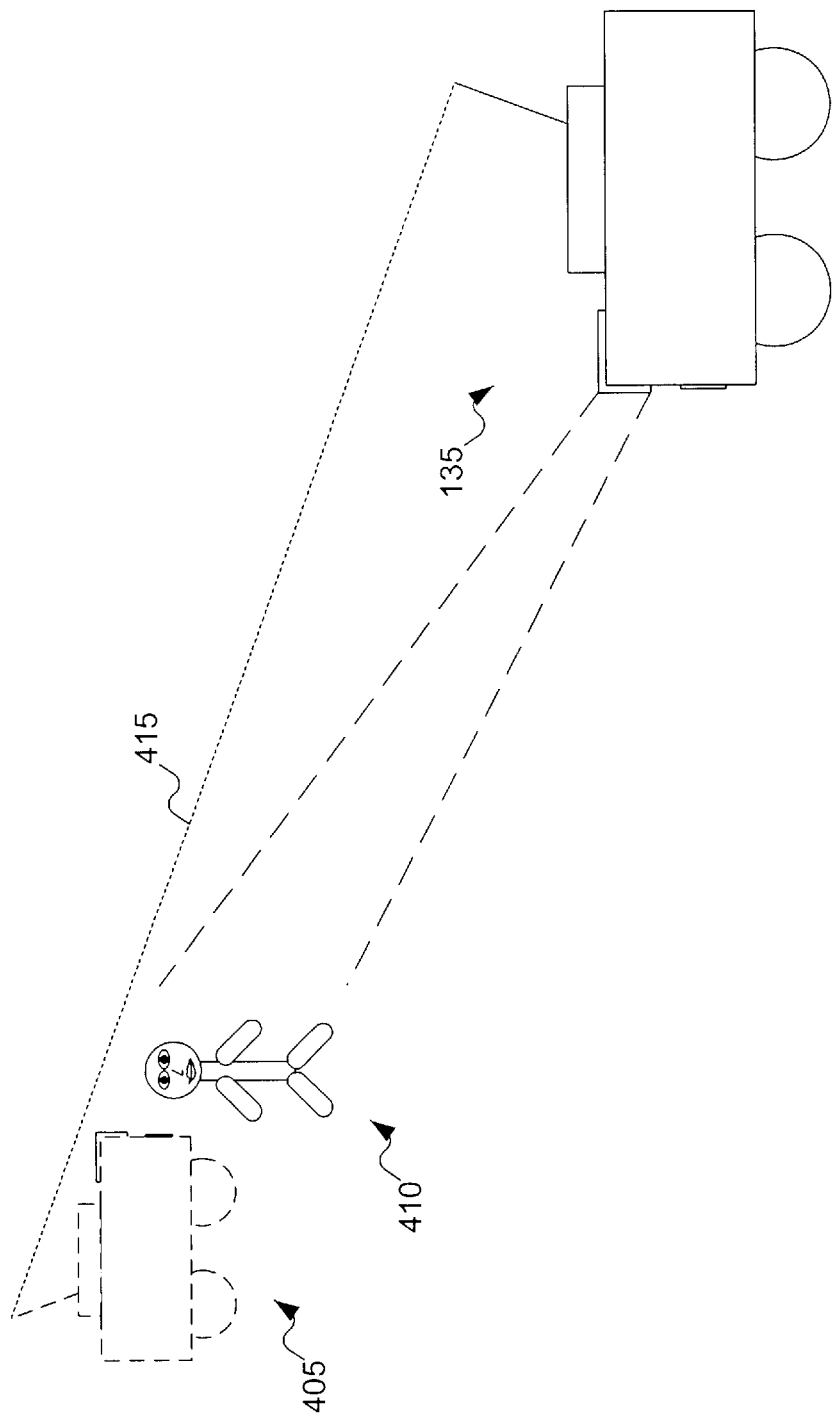
FIG. 4 shows two mobile remote control vehicles according to FIG. 1 interacting.

FIG. 4 shows two mobile remote control vehicles interacting. In this embodiment, the game may be a hunting game, where two mobile remote control vehicles, operated by separate users, hunt each other. To make the game more realistic, computer system 105 digitally removes one mobile remote control vehicle from the imagery of the other mobile remote control vehicle. So, for example, when computer system 105 determines that mobile remote control vehicle 405 is within the imagery from mobile remote control vehicle 135, computer system 105 digitally removes mobile remote control vehicle 405 from the imagery and replaces it with game character 410.

There are several ways computer system 105 may locate mobile remote control vehicle 405 in the imagery to remove it. Aside from computer system 105 scanning the imagery for the shape of mobile remote control vehicle 405, the two mobile remote control vehicles may communicate (as shown by dashed line 415) to keep each other informed of their locations. (Computer system 105 would need to keep the location of the other mobile remote control vehicle from the user to keep the game challenging.) Or the mobile remote control vehicles may be equipped with reflectors at key points. A person skilled in the art will also recognize other techniques for locating mobile remote control vehicle 405 to digitally remove it from an image.

Figure 5:
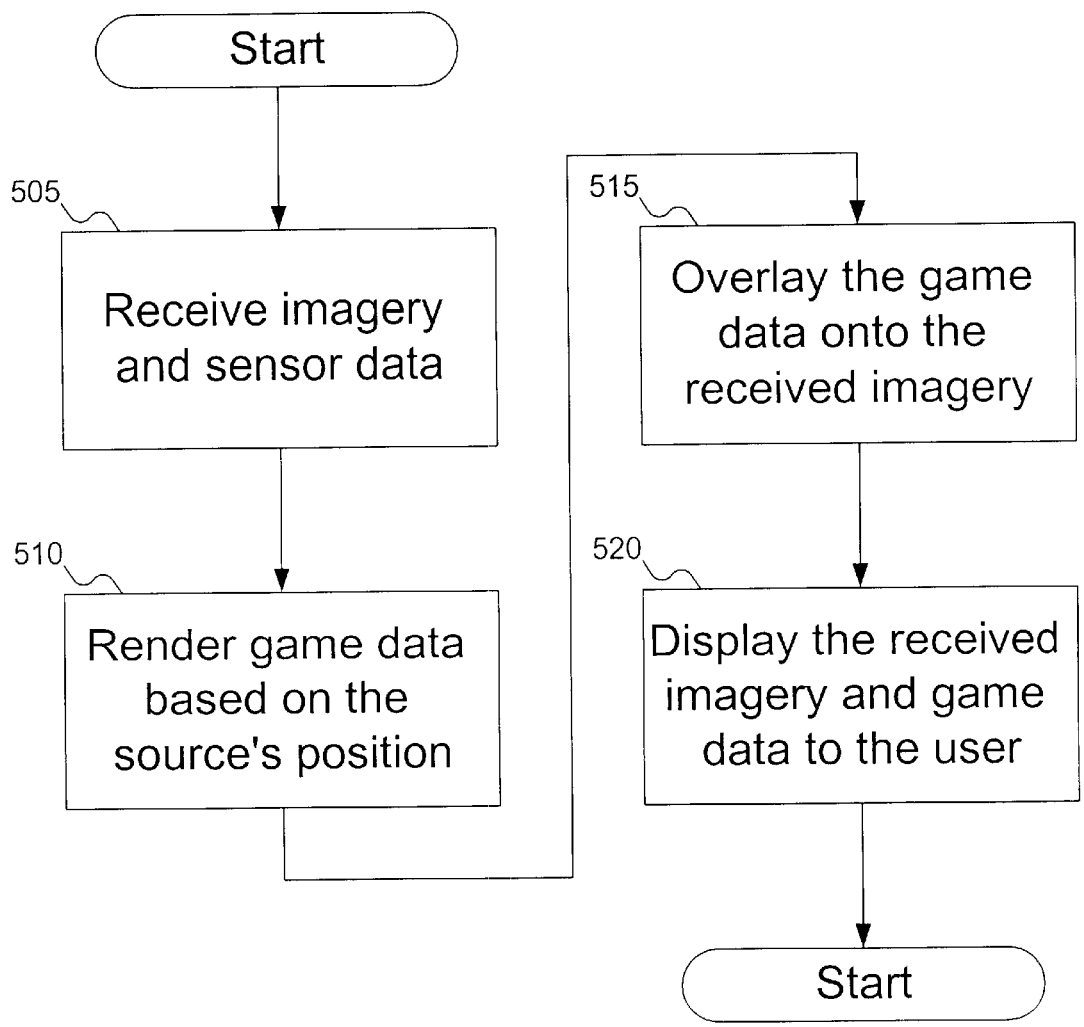
FIG. 5 shows the procedure used by the first embodiment to present the game to the user.

FIG. 5 shows the procedure used by the computer to present the game to the user. In block 505, the computer receives the imagery and sensor data to use. As discussed above, the imagery and sensor data may come from either the mobile remote control vehicle or from remote objects. In block 510, the computer renders game data based on the position of the imagery and sensor source (i.e., the mobile remote control vehicle or remote object). In block 515, the computer overlays the game data onto the imagery. Finally, in block 520, the computer displays the imagery and rendered game data to the user.

Figure 6:
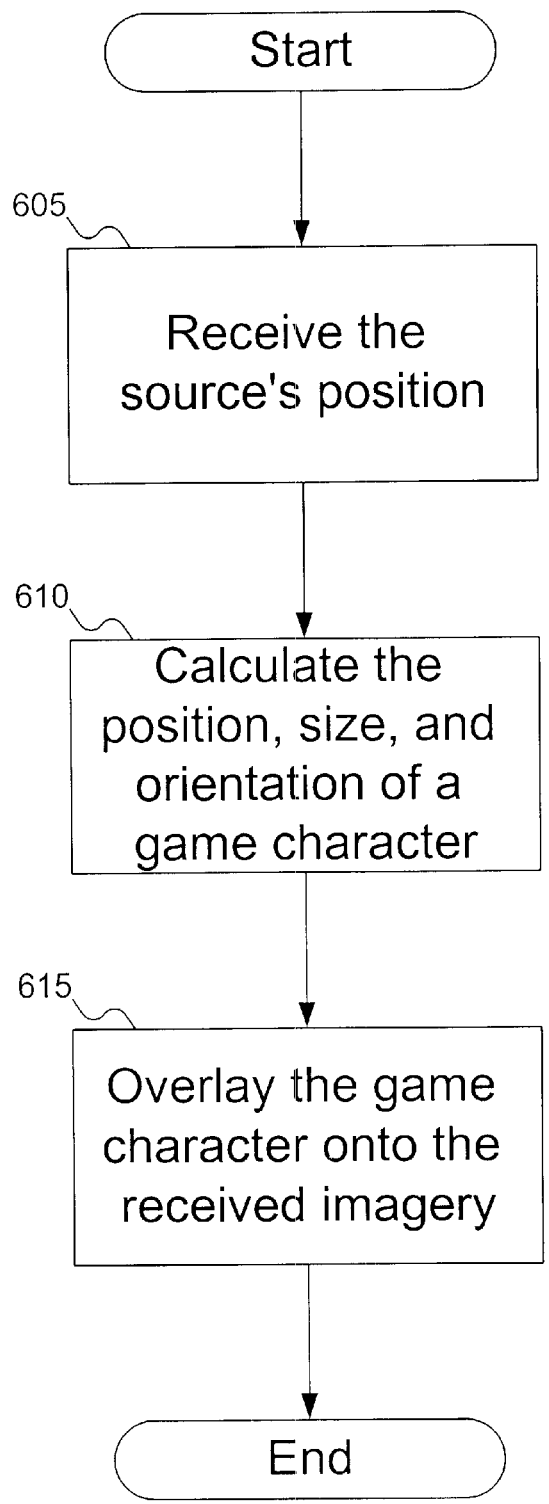
FIG. 6 shows more detail of the procedure used in rendering game data in FIG. 5.

FIG. 6 shows more detail of the procedure used in rendering game data (e.g., a game character). In block 605, the computer receives the position of the source. In block 610, the computer determines the game character's position, size, and orientation. Finally, in block 615, the computer overlays the game character in its position on the imagery.

Having illustrated and described the principles of our invention in an embodiment thereof, it should be readily apparent to those skilled in the art that the invention can be modified in arrangement and detail without departing from such principles. We claim all modifications coming within the spirit and scope of the accompanying claims.

We claim:

1. A gaming system, the gaming system comprising:
 a mobile remote control vehicle including a camera to capture imagery;
 a player-selectable environment in which the mobile remote control vehicle can operate, the player-selectable environmental one of a plurality of environments with which game data may be used; and
 a computer adapted to overlay the imagery from the camera on the mobile remote control vehicle with the game data.

2. A gaming system according to claim 1, wherein:
 the mobile remote control vehicle includes a first antenna adapted to wirelessly communicate with the gaming system; and
 the gaming system includes a second antenna adapted to wirelessly communicate with the mobile remote control vehicle.

3. A gaming system according to claim 2, wherein the first and second antennas are adapted to send the imagery captured by the camera on the mobile remote control vehicle from the first antenna to the second antenna.

4. A gaming system according to claim 2, wherein the first and second antennas are adapted to send sensor data captured by a sensor on the mobile remote control vehicle from the first antenna to the second antenna.

5. A gaming system according to claim 2, the gaming system further comprising a control unit adapted to control a movement of the mobile remote control vehicle, the control unit including the second antenna.

6. A gaming system according to claim 2, wherein the first antenna is constructed and arranged to wirelessly communicate with a second mobile remote control vehicle.

7. A gaming system according to claim 1, wherein the mobile remote control vehicle is remotely operated via the computer.

8. A gaming system according to claim 1, wherein the mobile remote control vehicle includes a sensor adapted to sense the environment.

9. A gaming system according to claim 8, wherein the sensor includes an impact sensor adapted to sense an impact with an object.

10. A gaming system according to claim 8, wherein the sensor includes a depth-of-field sensor adapted to determine distance to an object.

11. A gaming system according to claim 8, wherein the computer is adapted to use data from the sensor in overlaying the imagery from the camera on the mobile remote control vehicle with game data.

12. A gaming system according to claim 8, wherein:
 the sensor includes a second camera to capture imagery; and
 the computer is adapted to overlay the imagery from both the camera and the second camera on the mobile remote control vehicle with game data.

13. A gaming system according to claim 1, wherein the computer is adapted to overlay the imagery from the camera on the mobile remote control vehicle with rendered game characters.

14. A gaming system according to claim 13, wherein the computer is adapted to digitally replace an image of a second mobile remote control vehicle with a game character.

15. A gaming system according to claim 1, wherein the computer is adapted to overlay the imagery from the camera on the mobile remote control vehicle with special effects.

16. A gaming system according to claim 1, the gaming system further comprising a remote object adapted to interact with the mobile remote control vehicle.

17. A gaming system according to claim 16, wherein the remote object may follow the mobile remote control vehicle.

18. A gaming system according to claim 16, wherein the remote object includes an antenna adapted to wirelessly communicate with gaming system.

19. A gaming system according to claim 16, wherein the remote object includes an antenna adapted to wirelessly communicate with the mobile remote control vehicle.

20. A gaming system according to claim 16, wherein the remote object includes a camera to capture imagery.

21. A gaming system according to claim 20, wherein the computer is adapted to overlay the imagery from the camera on the remote object with game data.

22. A gaming system according to claim 1, the gaming system further comprising a control unit connected to the computer adapted to control a movement of the mobile remote control vehicle.

23. A gaming system according to claim 1, wherein the mobile remote control vehicle is beyond a line of sight from the computer.

24. A gaming system according to claim 1, wherein the imagery lacks any game data.

25. A gaming system according to claim 1, wherein the imagery is a background for the game data.

26. A gaming system according to claim 25, wherein the background is unrelated to the game data.

27. A gaming system according to claim 1, wherein the game data is one of a plurality of player-selectable game datas.

28. A gaming system according to claim 27, wherein each of the game datas may be used with each of the environments.

29. A gaming system, the gaming system comprising:
a mobile remote control vehicle including a camera to capture imagery;
a player-selectable environment in which the mobile remote control vehicle can operate, the player-selectable environment one of a plurality of environments with which game data may be used; and
a control unit adapted to control a movement of the mobile remote control vehicle, the control unit including a heads-up display of the imagery from the camera on the mobile remote control vehicle.

30. A gaming system according to claim 29, wherein:
the mobile remote control vehicle includes a first antenna adapted to wirelessly communicate with the control unit;
the control unit includes a second antenna adapted to wirelessly communicate with the mobile remote control vehicle.

31. A gaming system according to claim 29, wherein the imagery lacks any game data.

32. A gaming system according to claim 29, wherein the imagery is a background for the game data.

33. A gaming system according to claim 32, wherein the background is unrelated to the game data.

34. A gaming system according to claim 29, wherein the game data is one of a plurality of player-selectable game datas.

35. A gaming system according to claim 34, wherein each of the game datas may be used with each of the environments.

36. A method for using a computer in a gaming system with a mobile remote control vehicle, the method comprising:
selecting by a player an environment for the mobile remote control vehicle from a plurality of player-selectable environments with which game data may be used;
receiving imagery of the player-selected environment from a camera;
rendering the game data;
overlaying the game data onto the imagery received from the camera; and
displaying the overlaid imagery and game data to the player.

37. A method according to claim 36, wherein the mobile remote control vehicle includes the camera.

38. A method according to claim 36, wherein rendering game data includes:
calculating a position of a game character; and
placing the game character in the position on the imagery.

39. A method according to claim 38, wherein calculating a position includes calculating an orientation and size of the game character.

40. A method according to claim 36, wherein rendering game data includes rendering game data based on a location of the mobile remote control vehicle.

41. A method according to claim 36, wherein rendering game data includes adding special effects.

42. A method according to claim 36, wherein receiving imagery includes receiving none of the game data in the imagery.

43. A method according to claim 36, wherein receiving imagery includes receiving a background for the game data.

44. A method according to claim 43, wherein receiving a background includes receiving the background unrelated to the game data.

45. A method according to claim 36, further comprising selecting the game data from a plurality of player-selectable game datas.

46. A method according to claim 45, wherein each of the game datas may be used with each of the environments.

47. An article comprising:
a storage medium, said storage medium having stored thereon instructions, that, when executed by a computing device, result in:
receiving imagery of a player-selected environment from a camera, the player-selected environment one of a plurality of environments with which game data may be used;
rendering the game data;
overlaying the game data onto the imagery received from the camera; and
displaying the overlaid imagery and game data to the player.

48. An article according to claim 47, wherein the camera is included in a mobile remote control vehicle.

49. An article according to claim 47, wherein rendering game data includes:
calculating a position of a game character; and
placing the game character in the position on the imagery.

50. An article according to claim 49, wherein calculating a position includes calculating an orientation and size of the game character.

51. A method according to claim 47, wherein rendering game data includes rendering game data based on a location of a mobile remote control vehicle.

52. An article according to claim 47, wherein rendering game data includes adding special effects.

53. An article according to claim 47, wherein receiving imagery includes receiving none of the game data in the imagery.

54. An article according to claim 47, wherein receiving imagery includes receiving a background for the game data.

55. A method according to claim 54, wherein receiving a background includes receiving the background unrelated to the game data.

56. An article according to claim 32, further comprising selecting the game data from a plurality of player-selectable game datas.

57. An article according to claim 56, wherein each of the game datas may be used with each of the environments.

* * * * *

UNITED STATES PATENT AND TRADEMARK OFFICE
CERTIFICATE OF CORRECTION

PATENT NO. : 6,752,720 B1
DATED : June 22, 2004
INVENTOR(S) : Clapper et al.

It is certified that error appears in the above-identified patent and that said Letters Patent is hereby corrected as shown below:

Column 5,
Line 66, "player-selectable environmental one" should read -- player-selectable environmental one --

Column 8,
Line 61, "claim 32, further" should read -- claim 47, further --.

Signed and Sealed this

Third Day of May, 2005

JON W. DUDAS
*Director of the United States Patent and Trademark Office*